United States Patent [19]

Frederick

[11] Patent Number: 4,633,368

[45] Date of Patent: Dec. 30, 1986

[54] MULTIPLE FUNCTION INTEGRATED CAPACITOR

[75] Inventor: W. Richard Frederick, Mundelein, Ill.

[73] Assignee: Integrated Power Components, Wood Dale, Ill.

[21] Appl. No.: 794,245

[22] Filed: Oct. 31, 1985

[51] Int. Cl.⁴ .......................... H01G 4/38; H01G 7/00
[52] U.S. Cl. .................................... 361/328; 29/25.42
[58] Field of Search ............... 361/306, 307, 308, 309, 361/310, 323, 324, 328, 330, 321; 29/25.42

[56] References Cited

U.S. PATENT DOCUMENTS

| | | | |
|---|---|---|---|
| 3,365,632 | 1/1968 | Grahame | 361/310 X |
| 3,398,339 | 8/1968 | Pierpont et al. | 361/307 |
| 3,705,336 | 12/1972 | Kalstein | 361/330 |
| 4,028,595 | 6/1977 | Stockman | 361/328 |
| 4,170,812 | 10/1979 | Rayno | 29/25.42 |

FOREIGN PATENT DOCUMENTS 1562262 2/1969 France ............................ 361/328

Primary Examiner—Donald A. Griffin
Attorney, Agent, or Firm—Fitch, Even, Tabin & Flannery

[57] ABSTRACT

A multiple capacitive function wound capacitor. The capacitor includes a winding having a pair of ends and includes first, second and third insulative layers with each of the layers extending substantially from one end of the winding to the other end of the winding. The capacitor also includes a first electrode disposed between the first and second insulative layers and a second electrode located between the second and third layers. A third electrode is positioned on the side of the third layer away from the second electrode. One of the electrodes extends to one end of the winding and short of the other end while another of the electrodes terminates short of the one end but extends to the other end. The remaining electrode terminates short of both ends of the winding. A conductive tab electrically connects this last-mentioned electrode with a tab extending beyond a winding end and being insulated at the location where it passes that winding end. A conductor covers each of the winding ends so that contact with two of the electrodes is through respective ends of the winding while electrical contact with the remaining electrode is through the conductive tab. A method of winding a multiple capacitive function capacitor is also disclosed.

18 Claims, 13 Drawing Figures

MULTIPLE FUNCTION INTEGRATED CAPACITOR

The subject invention relates to electronic components and, more specifically, to a multiple function capacitor which can replace a trio of discrete, delta-connected capacitors.

BACKGROUND OF THE INVENTION

Among the various types of capacitors are those having a body formed by a winding of layers of insulative material and two sheets of foil. A wound capacitor, as do other types of capacitors, provides a single functional capacitive element of a predetermined value when incorporated into an electrical circuit. The two conductive sheets form the conductive electrode plates which are spaced by one or more layers of insulation, forming the dielectric. One type of prior art capacitor winding is shown in FIG. 1 where the foils 15 are narrower than the insulation layers 16 and the lateral sides of the foils are inset with respect to the ends of the windings. This type of construction is known as "inductive" because tab insert connectors are used which contact their respective foils at typically only one location in only one turn of the wound foil, usually about the middle of the length of the foil. Because of the single location of contact, inductance is greatly increased.

Another type of prior art wound capacitor is shown in FIG. 2 wherein the opposite lateral side of each foil 17 is extended to, and perhaps past, the corresponding edge of the insulation 18. As one foil extends to one end of the capacitor body but short of the other, while the remaining foil extends to the other end of the capacitor body but short of the first, the ends of the winding can be metallized to make contact with a corresponding foil. This staggering of the foils reduces inductance as the metallized end makes essentially continuous contact with the edge of the foil throughout its entire length.

The first types of wound capacitors employed paper for insulation. More recently, plastic film has been used for the dielectric material and metallized film has been used to provide both the dielectric and the electrode. All of these prior art wound capacitors, without regard to whether they are of the inductive type or of the non-inductive type capacitor construction, still only provide a single capacitive function. If the application requires multiple capacitive functions, multiple discrete capacitors have to be employed. These multiple discrete capacitors represent added expense and can take up much valuable space on a printed circuit board.

SUMMARY OF THE INVENTION

Among the several aspects and features of the present invention may be noted the provision of an improved, multiple function integrated capacitor. The capacitor consolidates the capacitive functions of three discrete capacitors into a single package, thereby greatly reducing costs and significantly reducing space required for mounting on a printed circuit board compared with accommodating several separate components. Additionally, the capacitor of the present invention greatly reduces inventory costs because only one component need be stocked instead of three separate components. The capacitor of the present invention may also include additional electrical components such as a bleeder resistor. Another feature of the capacitor is reduced inductance. The capacitor of the present invention is reliable in use, has long service life and is relatively simple and inexpensive to manufacture. Other aspects and features of the present invention will be, in part, apparent and, in part, specifically pointed out in the following specification and accompanying claims and drawings.

Briefly, the multiple capacitive function wound capacitor of the present invention includes a winding having a pair of ends and includes a first, a second and a third insulative layer with each of the layers extending substantially from one end of the winding to the other end of the winding. A first electrode is disposed between the first and second insulative layers while a second electrode is located between the second and third layers. A third electrode is disposed on the side of the third layer away from the second electrode with one of the electrodes extending to the one end of the winding and short of the other end of the winding. Another of the electrodes terminates short of the one winding end but extends to the other winding end, and the remaining electrode extends intermediate the winding ends but terminates short of each of them. A conductive tab is electrically connected to the remaining electrode and extends beyond a winding end with the tab being insulated at the location where it passes that end. A conductor at least partially covers each of the winding ends so that contact is made with multiple turns of each electrode, whereby the capacitor integrates three capacitive elements.

BRIEF DESCRIPTION OF THE DRAWINGS

Corresponding reference characters indicate corresponding components throughout the several views of the drawings.

DESCRIPTION OF THE PREFERRED EMBODIMENTS

Figure 3:
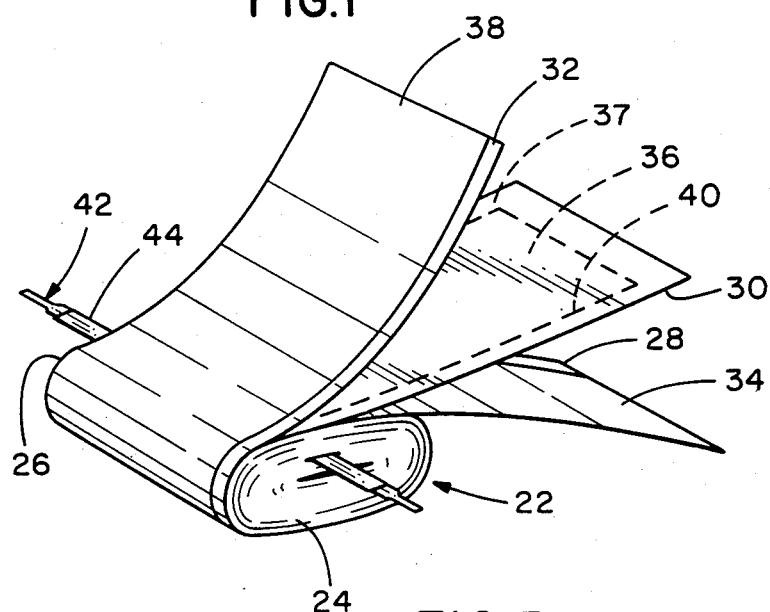
FIG. 3 is a perspective view of a winding embodying various features of the multiple capacitive function capacitor of the present invention.
Figure 10:
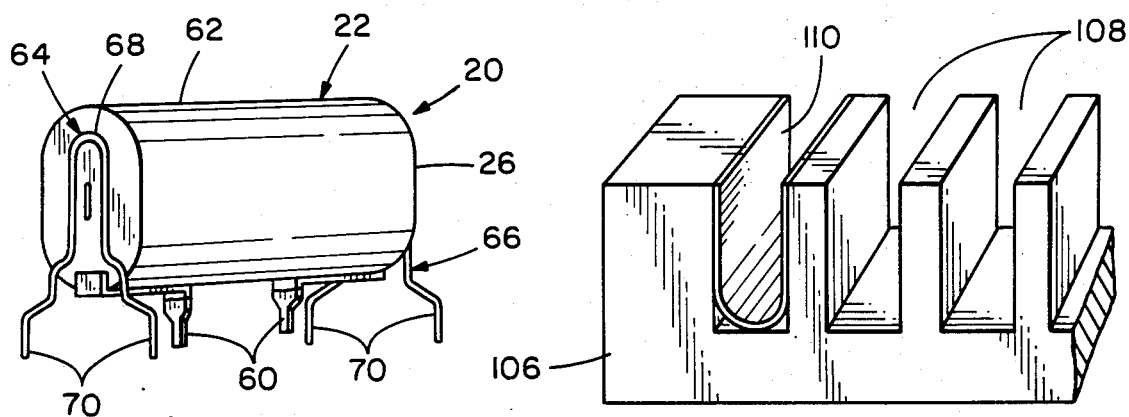
FIG. 10 is a perspective view of a partially completed capacitor incorporating the winding of FIG. 3.

Referring now to the drawings, a multiple capacitive function capacitor which integrates the functions of at least three individual capacitors, is generally indicated by reference numeral 20 in FIG. 10. A partially completed winding 22 or body of the capacitor is shown in FIG. 3. The winding has a pair of ends 24, 26 and includes a first, a second and a third insulative layer (28, 30 and 32, respectively) extending substantially from one winding end 24 to the other winding end 26. A first electrode 34 which is disposed between layers 28 and 30 extends to winding end 24 but not end 26. A second electrode 36 which is located between layers 30 and 32 terminates short of both winding ends with one lateral edge 37 of the electrode 36 in alignment with the inset edge of the electrode 34. The capacitor 20 includes a third electrode 38 positioned on the side of the third layer 32 away from the winding end 26 and terminates short of the winding end 24, preferably in general registration with the corresponding edge 40 of the electrode 36.

Electrical contact is made with the first electrode 34 and the third electrode 38 by providing a conductive covering, i.e., metallizing, the winding ends 24 and 26. A conductive tab 42 contacts the second electrode 36 near the middle of its length with the tab having an insulated portion 44 located at the passage of the tab through the winding end 26 to prevent formation of a conductive path between the second electrode 36 and third electrode 38. It will be appreciated that the capacitor 20 integrates a trio of capacitive elements. The first and third electrodes 34, 38 form the plates of a first or X capacitor while the second and third electrodes 36, 38 and the first and second electrodes 34, 36 form the respective plates of a second and third capacitor (Y capacitors).

Figure 4:
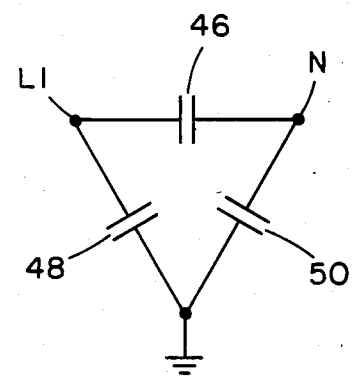
FIG. 4 is a schematic diagram of a delta capacitor circuit including an X capacitor and two Y capacitors.
Figure 5:
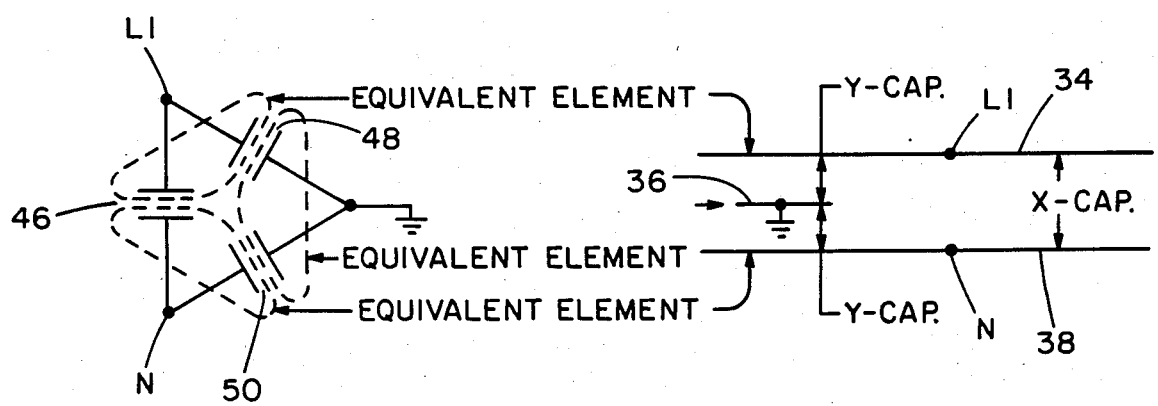
FIG. 5 illustrates the equivalence of the multiple function capacitor of the present invention and three discrete capacitors in a delta configuration.

The capacitor 20 is particularly useful in the delta capacitor circuit shown in FIG. 4 which has application in radio frequency interference (RFI) emission and susceptibility control. In this arrangement, the X capacitor 46 is connected between line L1 and neutral N. The Y capacitors 48, 50 are connected from L1 to ground and from N to ground, respectively. The equivalence of a delta circuit, using three discrete capacitors, to the capacitor 20 with the electrode 36 grounded, the electrode 34 connected to L1, and the electrode 38 connected to N is illustrated schematically in FIG. 5. The electrode 34 functions as a plate of capacitor 48 and a plate of capacitor 46. The electrode 36 performs the duties of a plate of capacitor 48 and a plate of capacitor 50. Finally, the electrode 38 is the equivalent of respective plates of capacitors 46 and 50. Capacitance and dielectric strength are controlled by appropriate selection of electrode size, distance between electrodes and/or dielectric constant of the insulative material separating the electrodes. It will be readily apparent to one of skill in the art that besides the delta configuration, other configurations requiring series and/or parallel circuits can be effected using the multiple function capacitor 20.

For example, the capacitor 20 has a construction which provides a line to neutral (X) capacitor which has a significantly higher self-resonant frequency than prior capacitors which have only two electrodes. It will be appreciated that the larger a conventional capacitor is, the lower its self-resonant frequency. Above this frequency, a capacitor acts as an inductor. Referring to FIG. 4, when capacitor 20 is used only as a composite X capacitor, there is no need to ground the electrode 36. In fact, the capacitor 20 is not ever provided with the tab 42. The result is that the discrete "X" capacitor 46, for connection across an electrical load, is shunted by the series combination of the much smaller capacitance capacitors 48 and 50. The presence of the smaller capacitors 48 and 50 across the larger capacitor 46 increases the self-resonant frequency of the composite X capacitor (formed by the three capacitive elements). This occurs because the smaller capacitors (with their higher self-resonant frequency) act to maintain the composite capacitor below its self-resonant frequency even though the self-resonant frequency of the larger capacitive element 46 has been exceeded and it acts as an inductor. Thus the capacitor 20 offers good high frequency performance and is usable over a much broader frequency range than capacitors of conventional design.

Figure 1:
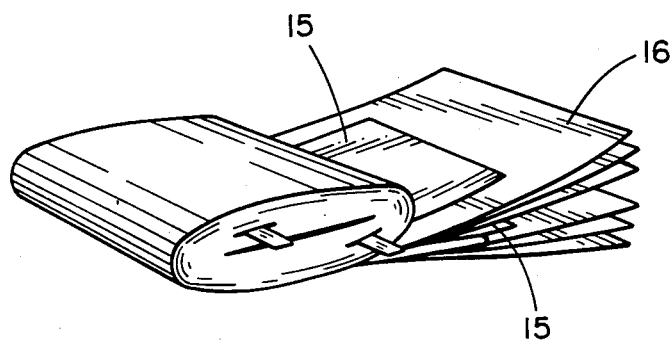
FIG. 1 is a perspective view of the winding or body of one type of prior art capacitor.
Figure 2:
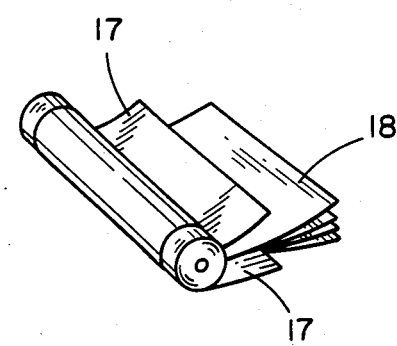
FIG. 2 is a perspective view of the winding of another type of prior art capacitor.
Figure 6:
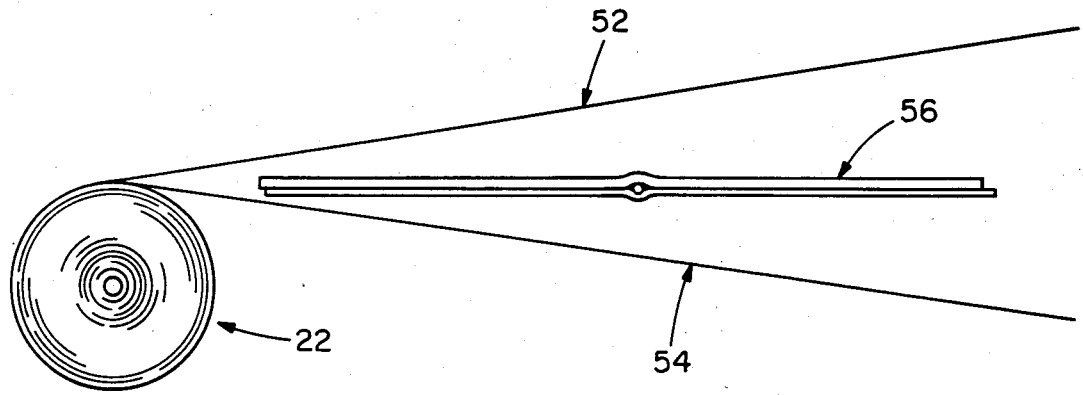
FIG. 6 is a simplified illustration of the components of the winding of FIG. 3.
Figure 7:
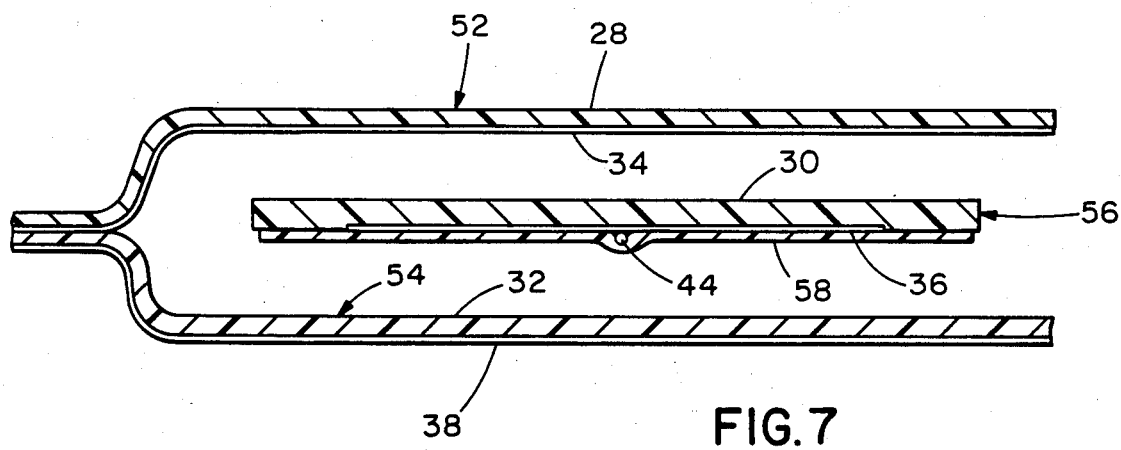
FIG. 7 is an enlarged end view of components of the winding of FIG. 3, including an insert.

More specifically, and referring to FIGS. 6 and 7, a sheet of plastic film 52, preferably polypropylene, metallized on its lower surface short of winding end 24, preferably forms the first insulative layer 28 and the first electrode 34. It is noted that the winding 22 shown in FIG. 2 has been inverted to better illustrate electrodes 34 and 38. The deposited metal could be aluminum or zinc with a deposited metal thickness on the order of 1,000 Å. It will be appreciated that this gives the capacitor 20 "self-healing" characteristics in that a momentary short circuit through the dielectric is eliminated, because the localized heat generated is sufficient to vaporize the thin electrode in the area of the breakdown. Similarly, another sheet of plastic film 54 metallized on its lower surface short of winding end 26 forms the third insulative layer 32 and the third electrode 38.

The second insulative layer 30 and the second electrode 36 are part of an insert 56 positioned between the metallized sheets 52 and 54. The insert includes a fourth insulative layer 58 extending fully between the winding ends 24 and 26 and disposed between the second electrode 36 and the third insulative 32. Preferably, the second insulative layer 30 has a thickness substantially equal to the combined thicknesses of insulative layers 58 and 32. Thus, when the sheets 52, 54 and the insert 56 are wound together, the second electrode 36 is substantially equally spaced from the electrodes 34 and 38. The insulative layers 30 and 58 are desirably plastic film, most preferably polypropylene, while the second electrode may be aluminum foil of a thickness of about 0.0005 inch.

Figure 8:
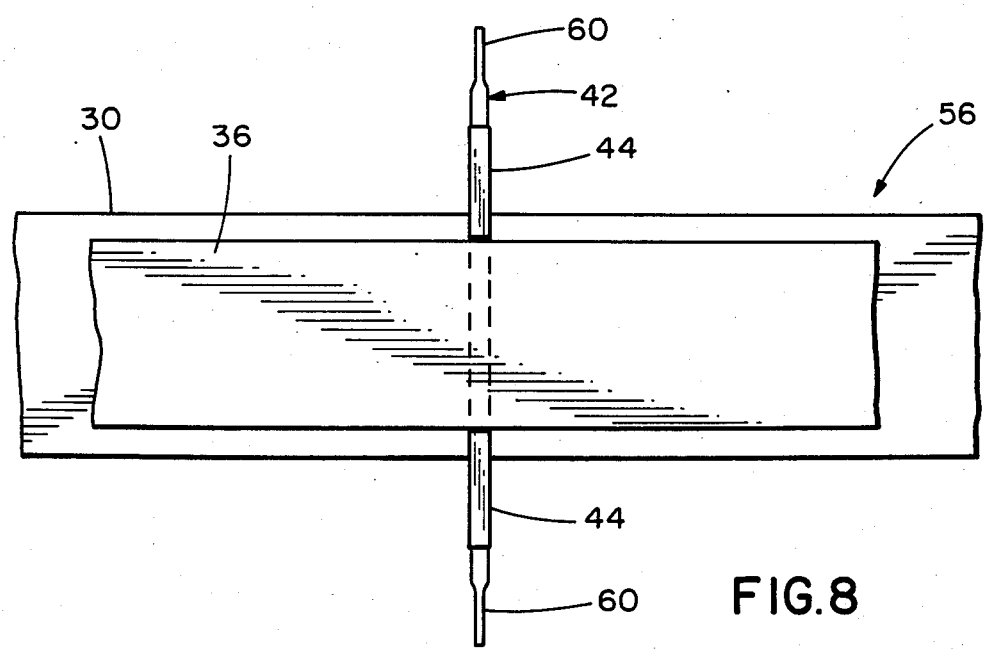
FIG. 8 is a plan view of the insert of FIG. 7.

Referring to FIG. 8, the layers 30 and 58 extend beyond the foil 36 laterally and at both longitudinally ends of the insert 56 to form an insulative periphery fully surrounding the foil. This feature provides the capacitor with a high dielectric voltage withstand. Also as shown in FIG. 8, the conductive tab 42 is symmetrical with respect to the insert, extending beyond both ends 24, 26 of the winding 22 and having a pair of insulative portions 44. The free ends 60 of the tab 42 are curled to form terminals, as shown in FIG. 10, with the insulative portions 44 being of sufficient length to maintain the tab out of electrical contact with the outer surface 62 of the winding as the tab is first bent to run along the surface 62, and bent again so the tab ends 60 extend away from the winding, parallel to each other.

The capacitor 20 also includes U-shaped leads 64, 66 fused to the respective metallized ends 24, 26 of the winding 22 for electrical connection to electrodes 34, 38, respectively. More specifically, each lead includes a bight portion 68 welded or soldered to a respective winding end, and a pair of parallel legs 70 extending away from the winding 22 generally parallel to tab ends 60.

Figure 9:
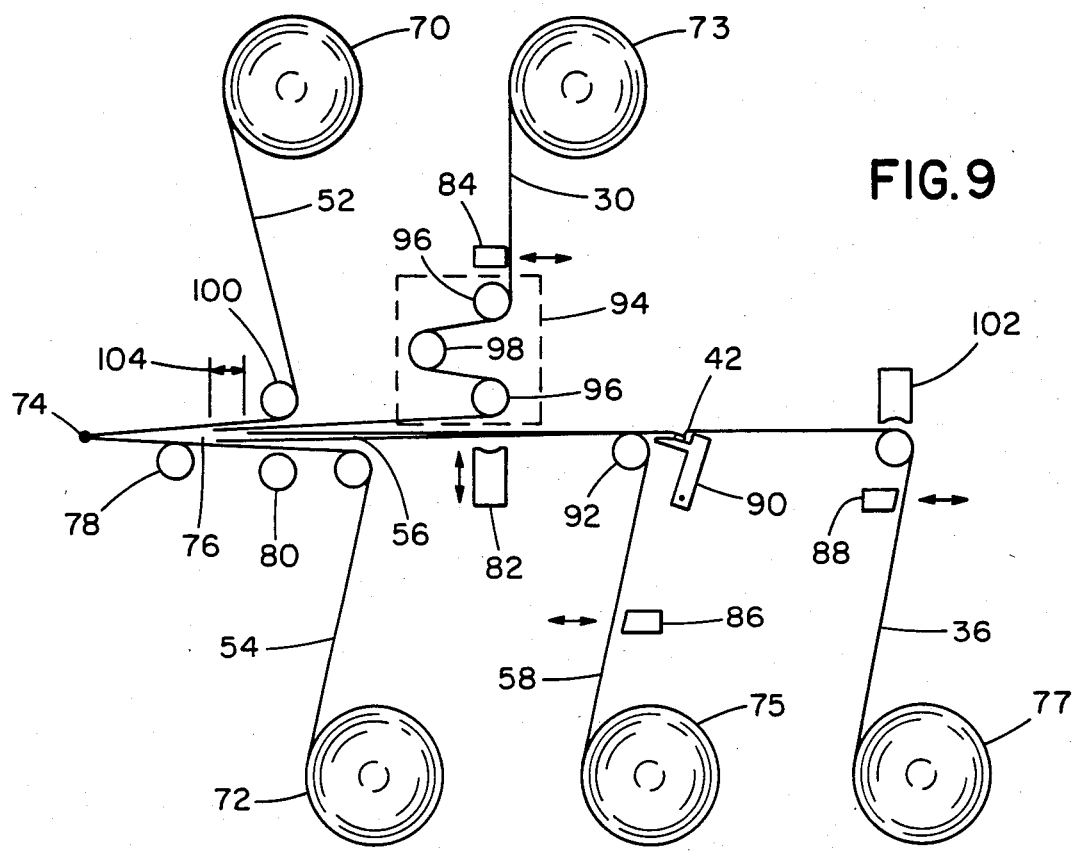
FIG. 9 is a simplified illustration of equipment used for manufacturing the winding of FIG. 3.

Simplified equipment for forming the capacitor winding 22 is schematically illustrated in FIG. 9. Spaced rolls 70, 72 of the metallized films 52, 54, respectively, are provided. The ends of the films 52, 54 are wound on an arbor 74 disposed downstream of the rolls, forming a V-shaped gap 76 between the films. The insert 56 made up of films 30 and 58 and conductive foil 36 (from rolls 73, 75 and 77, respectively), is held in the gap 76 between a vertically movable feed arm roller 78 and a feed pressure roller 80 in conjunction with a brake 82. While the metallized sheets 52 and 54 are being wound, the films 30 and 58 can be perforated by perforators 84 and 86, and the foil 36 can be perforated by a perforator 88. A pivotally mounted tab insert arm 90 can be actuated to place the tab 42 between the foil 36 and the sheet 58 with pressure holding the tab in place above a roller 92. Ultrasonic bonding or similar techniques can be used to bond the tab 42 to the foil 36 for specialized applications. The roller 92 is perferably positioned about one-half the distance between the end of the insert foil 36 in the gap 76 and the perforation at perforator 88. This centering of the ground electrical tab 42 midway between the ends of the foil 36 minimizes winding inductance and improves the line to ground high frequency performance.

The various lengths of the sheets 30 and 58 and the foil 36 making up the insert 56 between the gap 76 and the perforators 84, 86, 88 are adjustable by means of roller assemblies 94, only the one for sheet 30 being illustrated. Each assembly 94 includes a pair of spaced idler rollers 96 and a take-up roller 98 movable relative with respect to the idler rollers to vary the length of the sheet (or foil) held by the roller assembly. The tab insert assembly, made up of tab insert arm 90 and roller 92, is also movable to maintain centering of the tab 42 along the length of the insert 56. The lengths of the insert films 30 and 58 are preferably approximately 1½ inches longer than the length of the insert foil 36. This provides margins at the beginning and end of the insert, increasing the dielectric withstand voltage capability of the Y-type capacitive elements formed by capacitor 20. The presence of the insert dielectrics, formed by the films 30, 58 also increases this dielectric withstand voltage.

When the correct length of metallized sheets 52, 54 is wound on the arbor 74, and the length can be varied for different models depending on the specified X-capacitance, the insert operations starts. The arbor speed is slowed and feed arm roller 78 moves up to close the gap 76. When the gap 76 is closed, the roller 78 stops its upward motion, and feed pressure roller 80, preferably made of a resilient material such as rubber, moves up against an idler roller 100 to apply direct pressure on the insert material between the metallized films 52 and 54. The insert materials 30, 36 and 58 are then pulled onto the arbor 74 by the metallized films, 52 and 54. The arbor speed is increased again. The ground tab 42 moves into the incipient winding 22 in contact with the foil 36 around the arbor 74. The insulated portions 44 of the tab 42 extend past the ends 24, 26 the winding 22. The tab 42 is held in place along the length of the foil 36 during insertion by the pressure between the foil 36 and the film 58. When the correct foil insert length is reached, which along with all material lengths may be measured by photocell counters on appropriate idler rollers, a brake 102 engages, stopping the foil movement. The beginning of the foil 36 is already wrapped around the arbor 74 and continues to be pulled into the winding 22. This causes the foil to separate at the perforation, caused by perforator 88, which at this time is positioned in the gap 76 between rollers 78 and 80. The insert films 30 and 58 continue to feed into the winding, being pulled by the arbor 74 and sliding past the foil which is being held by brake 102. This sliding continues until a margin 104, which increases the dielectric withstand voltage, is achieved. Brake 82 then energizes, stopping the film insert dielectrics. The insert dielectrics wrapped around the arbor 74 continue to be wound into the winding 22, causing the insert dielectrics to separate at the perforations, which are now correctly positioned in gap 76. The feed arm roller 78 then lowers to open the gap 76 to its original size. The arbor 74 continues to turn, finishing the final wrap operation with metallized films 52 and 54. These films 52 and 54 are then cut and the ends are glue-sealed. After the winding 22 is completed, it is removed from the arbor 74, flattened to close the arbor hole and cured using standard processes.

The ground tab 42 is then masked and the ends 24, 26 of the winding 22 are metallized using a flame, arc or similar spray. Current-carrying U-shaped leads 64, 66 are then soldered or welded to the metallized ends 24, 26 of the winding 22, forming the low inductance capacitor contacts for the hot and neutral sides of the capacitor. The double-ended ground tab 42 provides parallel contact to the ground insert electrode 36. This also provides a low inductance contact to the ground. These low inductance contacts improve the high frequency performance of the capacitor.

Figure 11:
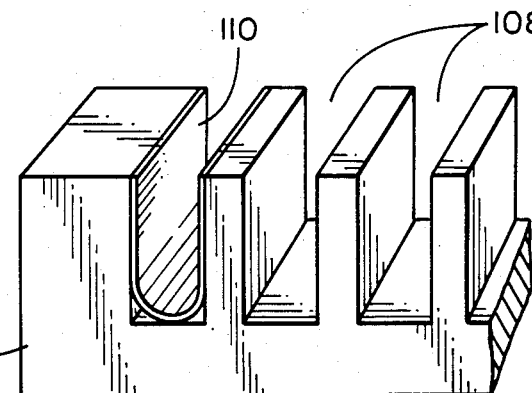
FIG. 11 illustrates a mold useful in encapsulating the capacitor of FIG. 10.

The finished capacitor 20 is then epoxy encapsulated and stamped. The epoxy encapsulating system uses a modified mold and fill process. As shown in FIG. 11, the mold 106 is open-ended, having rectangular cavities 108. Stamped clear labels 110, extending approximately 0.015 inches past the ends of the mold are inserted into these cavities. The resilience of the plastic label material causes it to form itself to the sides of the mold and it forms its own natural arc against the bottom of the cavity. The top edges of the label are flush with the top of the cavity. Masking tape is then placed across the open ends of the mold with its adhesive forming a seal along the edges of the insert label that extend past the ends of the mold. The masking tape is held in place by contact with the adjacent sides of the mold. The tape seal prevents epoxy leakage when the mold is filled. The mold is then partially filled with epoxy, and the component is placed inside the cavity with the leads protruding out the open top of the mold. The epoxy is displaced by the part, bringing the epoxy level to the top of the mold. The epoxy is then cured using standard processes. The masking tape is removed and the completed part with the label adhering to the epoxy is removed from the mold by pushing it out the open end. This process eliminates mold/epoxy adhesion problems since there is no direct contact between the epoxy and the mold. The process advantages also include lower cost molds since part removal methods, anti-adhesion coatings, release radii, polished surfaces, expensive materials and complex cavity shapes with ends are not needed.

As a method of forming the multiple capacitive function wound capacitor 20, the present invention includes several steps:

(a) A capacitor winding 22 having a pair of spaced ends 24 and 26 is formed by providing two spaced rolls 70, 72 of metallized film with the metal side of one film terminating short of one end of the winding but extending to the other end of the winding, and with the other film having metallization that extends to the one end of the winding but short of the other end of the winding so that the metallized portions of the two films are staggered.

(b) The leading ends of the two films are wound on an arbor so that the leading portions of the films wound on the arbor form a "V".

(c) A sandwich structure formed by a pair of dielectric layers encompassing a metal foil which terminates short of both ends of the winding, is inserted in the V.

(d) The foil is attached to a conductive tab.

(e) The ends of the completed winding are metallized.

(f) The tab is insulated from the metallized end.

Figure 12:
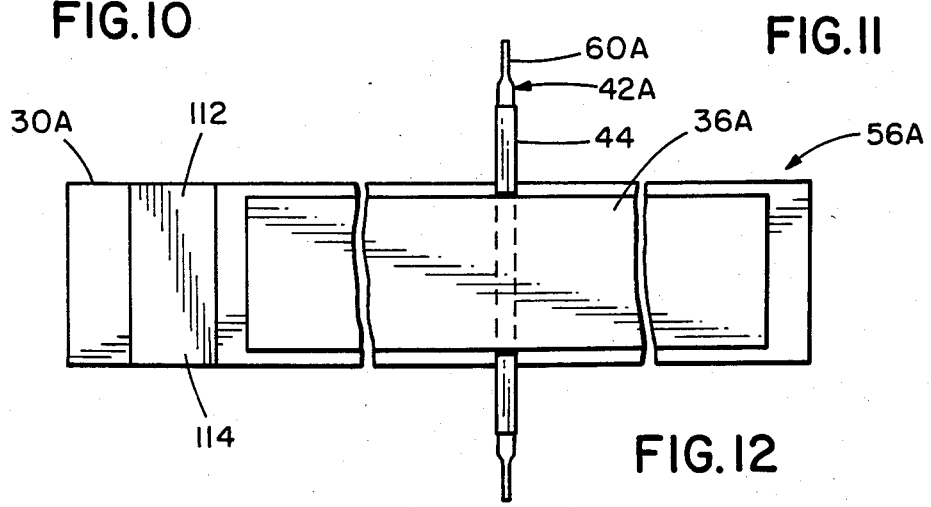
FIG. 12, is similar to FIG. 8, illustrates an alternative embodiment of the insert which incorporates a bleeder resistor.

Referring to FIG. 12 an alternative embodiment 20A of the capacitor of the present invention is shown which integrates additional electrical functional elements. Components of capacitor 20A which correspond to components of the capacitor 20 are designated by the reference numeral assigned to the component of capacitor 20 with the addition of the suffix "A". The insert 56A is shown and includes a resistive coating or laminate 112 which forms a bleeder resistor 114 for the capacitor 20A by extending fully between winding ends 24A and 26A. This resistive coating is disposed adjacent to one longitudinal end of the insert, between dielectric layers 30A and 58A and is spaced from the end of the second electrode 36A. It will be appreciated that when the ends 24A, 26A, of the winding 22A are metallized, the bleeder resistor will be placed in parallel with the X capacitive element formed by electrodes 34 and 38. It will also be appreciated that other electrical elements such as additional resistors or transient suppression elements can also be integrated into the capacitor by using appropriate flexible materials and inserting them into the winding in a similar manner.

Figure 13:
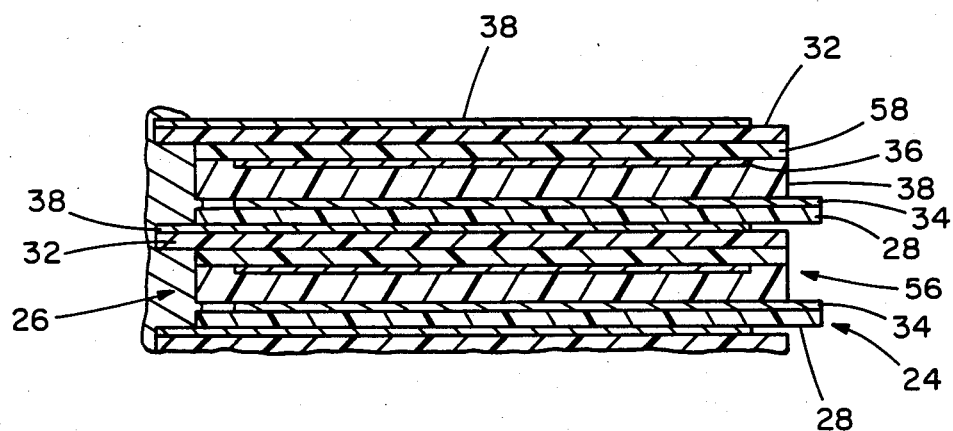
FIG. 13 is a cross-sectional view of a part of the winding of FIG. 3, with certain components greatly exaggerated in size, illustrating a slight offset of various components to facilitate reliable metallization of the ends of the winding.

As shown in the greatly exaggerated FIG. 13 which depicts various layers formed by several turns of the winding with only the winding end 26 metallized, while the first insulative layer 28 and the third insulative layer 32 (as well as the insert 56 including the second insulative layer 30) do extend substantially from the one winding end 24 to the other winding end 26, certain components are preferably slightly inset with respect to the winding ends to permit the metallization applied at the respective ends to make surface contact with their corresponding electrodes 34 and 38, as opposed to only making line contact with the ends of respective electrodes. The extent of inset is very small compared to the width of the winding (the distance between ends 24 and 26) which may be over 0.8 inch. More specifically, relative to the winding end 24, the insert 56 and the insulative layer 32 are recessed about 1 millimeter. The result is that gaps are formed between turns of insulative layer 28. As the electrode 34, formed by metallization on one surface of layer 28, extends to the winding end 24, metallization of the end 24 causes metal to fill the gaps to make surface contact, resulting in a reliable low impedance connection. Similarly at winding end 26 the insert 56 and the insulative layer 28 are recessed about 1 millimeter so that metallization at the end 26 results in surface contact with the electrode 38 which extends to the end 26.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A multiple capacitive function wound capacitor comprising:

a winding having a pair of ends and including a first, a second and a third insulative layer with each of said layers extending substantially from one end of said winding to the other end of said winding;

a first electrode disposed between said first and second insulative layers;

a second electrode disposed between said second and third layers;

a third electrode positioned on the side of said third layer away from said second electrode, one of said electrodes extending to said one end of said winding and short of the other end of the winding, another of said electrodes terminating short of said one end and extending to said other end, and the remaining electrode extending intermediate said ends and terminating short of each of said ends;

a conductive tab electrically connected to said remaining electrode and extending beyond said one winding end, said tab being insulated at the location where it passes said one end;

conductive means at least partially covering said winding one end, making electrical contact with multiple turns of said one electrode and including a lead; and conductive means at least partially covering said winding other end, making electrical contact with multiple turns of the other electrode and including a lead, whereby said capacitor integrates three capacitive elements.

2. A capacitor as set forth in claim 1 wherein said first electrode is said one electrode, said third electrode is said other electrode, and said second electrode is said remaining electrode.

3. A capacitor as set forth in claim 2 wherein said first electrode is a metallization formed on said first insulative layer and said third electrode is a metallization formed on said third insulative layer.

4. A capacitor as set forth in claim 3 wherein said first and third layers are formed of a plastic film.

5. A capacitor as set forth in claim 2 further comprising a fourth insulative layer extending substantially from one end of said winding to the other end of said winding and being positioned between said second electrode and said third insulative layer.

6. A capacitor as set forth in claim 5 wherein the thickness of said second insulative layer is substantially equal to the sum of the thicknesses of said fourth layer and said third layer whereby said second electrode is substantially equally spaced from said first electrode and said second electrode.

7. A capacitor as set forth in claim 5 wherein said second electrode is a foil.

8. A capacitor as set forth in claim 7 wherein said second electrode and said second and fourth insulative layers constitute an insert having longitudinal ends extending transversely to said winding ends, and lateral sides, said inset having an insulative periphery surrounding said foil.

9. A capacitor as set forth in claim 2 further including an additional electrical component disposed between said second insulative layer and said third insulative layer, said electrical component being spaced from said second electrode.

10. A capacitor as set forth in claim 9 wherein said additional component is a bleeder resistor formed by a resistive material extending fully between said winding ends so that the capacitive element formed by said first and third electrodes is shunted by said resistor.

11. A capacitor as set forth in claim 1 wherein the conductive means covering the winding ends is formed by metallizing the winding ends, with each of said leads fused to its corresponding metallized end.

12. A capacitor as set forth in as set forth in claim 11 wherein each lead is generally U-shaped with the bight fused and legs of the U extending from said winding.

13. A winding for an integrated, delta wound capacitor, said winding having a pair of ends and comprising:
a first dielectric film having one side metallized with the metal extending to one end of said winding and terminating short of the other end of said winding;
a second dielectric film of substantially the same width as said first film and having one side metallized with the metal terminating short of said one end and extending to said other end; and
an insert positioned between the metallized side of said first film and the non-metallized side of said second film, said insert including a foil sandwiched between a pair of dielectric layers extending substantially from one winding end to substantially the other winding end with said foil terminating short of both of said winding ends, said insert further including a connector contacting said foil and extending substantially beyond said winding, each end of said winding being covered by metallization with said connector being electrically insulated from said ends, whereby connection to a first capacitive element formed by said metallized films can be made through said ends, connection to a second capacitive element formed by said foil and the first metallized film can be made through said one end and said connector, and connection to a third capacitive element formed by said foil and the second metallized film can be made through said other end and said connector.

14. A winding as set forth in claim 13 wherein the lateral sides of said foil are aligned with corresponding metallized edges of said films.

15. A winding as set forth in claim 13 wherein said insert further includes a resistive path spaced from said foil and extending between said dielectric layers from said one end to said other end to form a bleeder resistor for said first capacitive elment.

16. A winding as set forth in claim 13 wherein said foil terminates short of the longitudinal ends of said pair of dielectric layers so that said insert defines an insulative periphery encompassing said foil.

17. A method of forming a multiple capacitive function wound capacitor including the following steps:
(a) forming a capacitor winding having a pair of spaced ends by providing two spaced rolls of metallized film with the metal side of one film terminating short of one end of the winding but extending to the other end of the winding and with the other film having metallization that extends from the other end of the winding but short of the one end of the winding so that the metallized portions of the two films are staggered;
(b) winding the leading ends of the two films on an arbor so that the leading portions of said films wound on the arbor form a V;
(c) inserting between the film portions forming the V a sandwich structure formed by a pair of dielectric layers encompassing a metallic foil which foil terminates short of both ends of the winding;
(d) attaching to said foil a conductive tab;
(e) metallizing the ends of the completed winding; and
(f) insulating the tab from said metallized ends.

18. A multiple capacitive function wound capacitor comprising:
a winding having a pair of ends and including a first, a second and a third insulative layer with each of said layers extending substantially from one end of said winding to the other end of said winding;
a first electrode disposed between said first and second insulative layers;
a second electrode disposed between said second and third layers;
a third electrode positioned on the side of said third layer away from said second electrode, said first electrode extending to said one end of said winding and short of the other end of the winding, said third electrode terminating short of said one end and extending to said other end, and said second electrode extending intermediate said ends and terminating short of each of said ends, said first electrode being a metallization on said first layer and said third electrode being a metallization on said third layer, said second and third insulative layers being slightly recessed relative to said one end and said first and second insulative layers being slightly recessed relative to said other end;
conductive means at least partially covering said winding one end, making electrical contact with multiple turns of said one electrode and including a lead; and
conductive means at least partially covering said winding other end, making electrical contact with multiple turns of the third electrode and including a lead.

* * * * *